(12) United States Patent
Blackwell et al.

(10) Patent No.: US 6,326,413 B1
(45) Date of Patent: Dec. 4, 2001

(54) PROCESS AND APPARATUS FOR PRODUCING PLASTICS AND POLYMERIC FOAM

(75) Inventors: James B. Blackwell, Cheshire; Geoffrey Buckley, Oldham; John J. Blackwell; Stephen W. Blackwell, both of Cheshire, all of (GB)

(73) Assignee: Beamech Group Limited, Manchester (GB)

( * ) Notice: Subject to any disclaimer, the term of this patent is extended or adjusted under 35 U.S.C. 154(b) by 0 days.

(21) Appl. No.: 09/600,080

(22) PCT Filed: Jan. 8, 1999

(86) PCT No.: PCT/GB99/00061

§ 371 Date: Aug. 25, 2000

§ 102(e) Date: Aug. 25, 2000

(87) PCT Pub. No.: WO99/34965

PCT Pub. Date: Jul. 15, 1999

(30) Foreign Application Priority Data

Jan. 9, 1998 (WO) .................................. PCT/GB98/00067

(51) Int. Cl.⁷ ....................................................... C08J 9/00
(52) U.S. Cl. ..................... 521/130; 264/45.9; 264/50; 264/51; 264/176.1; 264/211; 264/211.21; 425/4 R; 425/4 C; 425/190; 521/79; 521/80; 521/155; 521/917
(58) Field of Search ............................... 521/79, 80, 130, 521/155, 917; 264/45.9, 50, 51, 176.1, 211, 24.21; 425/4 R, 4 C, 190

(56) References Cited

U.S. PATENT DOCUMENTS

| 3,108,976 | 10/1963 | Knox . |
| 3,256,218 | 6/1966 | Knox . |
| 3,865,078 | 2/1975 | De Howitt et al. . |
| 4,906,672 | 3/1990 | Stone et al. ........................... 521/130 |
| 5,280,300 | 1/1994 | Fong et al. . |
| 5,883,143 | * 3/1999 | Eiben et al. .......................... 521/130 |
| 6,005,014 | * 12/1999 | Blackwell et al. ..................... 521/80 |
| 6,100,309 | 8/2000 | Illger et al. .......................... 521/133 |

FOREIGN PATENT DOCUMENTS

| 0 011 381 | 5/1980 | (EP) . |
| 0 645 226 | 3/1995 | (EP) . |
| 0 810 256 | 12/1997 | (EP) . |
| 1 575 049 | 9/1980 | (GB) . |
| WO 96/00644 | 1/1996 | (WO) . |
| WO 96/02377 | 2/1996 | (WO) . |
| WO 96/16782 | 6/1996 | (WO) . |
| WO 97/02938 | 1/1997 | (WO) . |
| WO 97/45240 | 12/1997 | (WO) . |
| WO 97/47453 | 12/1997 | (WO) . |

OTHER PUBLICATIONS

A. Fischer et al, "Pulvermetallurgische Bauelemente in der Verfahrenstechnik" Chemie. Ingenieur. Technik., vol. 62, No. 4, 1990, pp. 263–270.

* cited by examiner

Primary Examiner—John M. Cooney, Jr.
(74) Attorney, Agent, or Firm—Christie, Parker & Hale, LLP

(57) ABSTRACT

A process and apparatus for producing polyurethane foam, comprising bringing together under pressure one or more foam components and a gaseous $CO_2$ auxiliary blowing agent and discharging the combination through a permeable discharge head in the form of plural individual wire meshes sintered together to form at least one composite element having a structure such as to require repeated division, divergence and convergence of flow paths and impingement of the individual flows with the sintered wire mesh and the flows through adjacent pores in three dimensions within its axial thickness, and at which the pressure is reduced for forming a froth, wherein the combination of the foam components and gaseous $CO_2$ is arranged to be in a non-homogeneous state containing gas bubbles prior to passage through the discharge head.

27 Claims, 4 Drawing Sheets

PROCESS AND APPARATUS FOR PRODUCING PLASTICS AND POLYMERIC FOAM

The present invention relates to a process and apparatus for producing polyurethane foam and in particular to an apparatus and process for the continuous and non-continuous production of polyurethane foam using a gas as the auxiliary blowing agent.

The preparation of polyurethane foams conventionally requires the mixing of several components which cures to form a foamed mass. Typically, the components include a polyol, an isocyanate, a catalyst or catalysts, a surfactant, activators and water. When these components are mixed together in the correct proportions, the water reacts with the isocyanate to produce carbon dioxide for expansion of the polyurethane.

By discharging a layer of the mixture onto a moving conveyor (with a movable base and with adjustable opposed sidewalls) the components of the mixture react and continuously produce a polymeric foam block.

More recently, the continuous production of low density and soft high density foams has involved the use of a relatively inert, low boiling point liquid which is mixed under pressure in a liquid state with the other chemical components in order to provide an auxiliary blowing/frothing action on the mixture before the mixture expands by production of carbon dioxide from the isocyanate/water reaction. The mixture is discharged onto the conveyor and the vaporised low boiling point liquid expands the reaction mixture which then subsequently expands by the chemical production of carbon dioxide from the reaction mixture to form a polymeric foam.

Previously, suitable blowing/frothing agents have included various chlorofluorocarbons (CFCs). Although CFCs have the desired inertness and relatively low boiling point, their use has recently been discouraged on environmental considerations since it is believed that CFCs contribute to depletion of the ozone layer. A suitable replacement for CFCs is carbon dioxide but, since carbon dioxide vaporises at a much lower temperature than . . . CFCs, and indeed must be pressurised in order to exist as a liquid, relatively high pressures have had to be maintained throughout the apparatus and method.

However, unless the expansion of the carbon dioxide occurs under controlled conditions, some of it can be lost and the efficiency of the foam expansion is reduced and poor quality foam may be produced, with non-uniform cell structure and voids or "pin-holes".

The apparatus described in EP-A-0645226 attempts to discharge the reaction mixture under controlled conditions by discharging the mixture through an elongate pressure-drop zone to initiate frothing, flowing the frothing mixture along a frothing cavity and through an outlet aperture and subsequently discharging the frothing mixture onto a substrate. It also discloses that relatively large amounts of nucleating gases are added to assist in bubble formation.

In published WO96/00644 and WO96/02377 it is proposed to expand a single phase homogeneous foamable reactive mixture containing dissolved liquid $CO_2$ into a large number of individual flows at shear rates above 500 per second.

The "reactive mixture" which is used in the techniques disclosed and claimed in both WO96/00644 and WO96/02377 is obtained, using at least two reactive components and carbon dioxide as expanding agent, by mixing at least one of the reactive components with carbon dioxide under pressure, thereby producing a mixture containing liquid carbon dioxide, and subsequently mixing the resultant mixture with the other reactive components to form a single phase homogeneous foamable reactive mixture. The latter sequential mixing steps are typically carried out in a conventional static mixer and a rotary mixing head, respectively. As is well known, conventional "static mixers" incorporate a plurality of angled vanes disposed within an internal chamber such as to promote turbulence and mixing of component fluids passed therethrough.

Thus, the method and apparatus of EP-A-0645226, WO96/00644 and WO96/02377 are all based on a three step process of:

(1) pre-mixing under pressure at least one of the reactants and liquid $CO_2$;
(2) mixing the component containing the liquid carbon dioxide with the further reactive components or with the second reactive component under pressure; and then
(3) passing the mixed single phase homogeneous reactive components containing the liquid $CO_2$ through a pressure reducing device.

The latter systems all rely on having fully mixed single phase homogeneous "reactive mixtures" upstream of the fine-mesh screen(s) or screen packaging, since insufficient or insufficiently uniform mixing takes place within the screen apertures themselves.

Other processes using liquid $CO_2$ require the addition of a higher than normal quantity of supplementary nucleating gases. We have discovered that using our permeable discharge head described hereinafter largely eliminates these supplementary nucleating gases.

Numerous patents have been issued on the use of liquid $CO_2$ in polyurethane foam. U.S. Pat. No. 4,906,672 refers to methods of adding and dissolving gaseous $CO_2$ under pressure to the foaming reactants but does not disclose a method of controlling the final pressure reduction and expansion.

The problems of processing with a non-homogeneous combination of foam reactants and $CO_2$ prior to the discharge device are described in WO96/00644. The discharge device covered by this patent requires "that there is still no formation of gas bubbles prior to passage through the screen"

Published WO96/00644, U.S. Pat. Nos. 3,108,976 and 3,256,218 all propose the use of multiple plain perforated plates for the purpose of achieving the final discharge of foam reactants containing the blowing agent under controlled pressure and controlled cell expansion. WO96/00644 refers to the use of carbon dioxide in the liquid phase whilst U.S. Pat. Nos. 3,108,976 and 3,256,218 refers to $CO_2$ in both the gaseous and liquid phase. For the reason given in WO96/00644 when using the known multiple plain perforated plates in the discharge device, the quality of foam produced is not of commercially acceptable quality unless a homogeneous mixture, ie. a mixture existing in a single phase (liquid) state, of foam reactants and carbon dioxide is present prior to passage through the discharge device.

It is an object of the present invention to provide a process and apparatus which will give good polyurethane foam using a gaseous auxiliary blowing agent, particularly gaseous $CO_2$.

There is described in our own earlier publication WO-A-9702938 a process and apparatus for producing polyurethane foam, wherein reactive foam components and a low-boiling point frothing agent are brought together, under sufficient pressure to maintain the frothing agent in a liquid state, and then passed through a permeable discharge head from which the resulting mixture is discharged, with the pressure being reduced and froth being formed, the permeable discharge head comprising at least one diffuser element having a structure which repeatedly divides and mixes flow paths in three dimensions within the axial thickness of the diffuser element, considered in the direction of flow therethrough, the diffuser element comprising two or more layers of wire mesh which have been sintered together such that contact points of the mesh layers are fused together by the sintering process.

Surprisingly, it has been found that the use of our special permeable discharge head, in the form of plural individual wire meshes sintered together to form at least one composite element which repeatedly mixes the flows as they pass therethrough, enables the production of good quality foam, when the foam components and gaseous $CO_2$ blowing agent are arranged always to remain in a non-homogeneous state prior to expansion. This therefore means that it is not necessary to ensure fully dissolving of the gaseous $CO_2$ (ie. it is not necessary to have or achieve a homogeneous mixture prior to expansion) and the $CO_2$ can be inserted only a small distance from the discharge head, corresponding to only a short time, before it reaches the discharge head.

In accordance with the present invention in its broadest aspect, there is provided a process for producing polyurethane foam, comprising bringing together under pressure one or more reactive foam components and a gaseous non-reactive auxiliary blowing agent and discharging the combination through a permeable discharge head in the form of plural individual wire meshes sintered together to form at least one composite element which repeatedly mixes the flows as they pass therethrough, and at which the pressure is reduced for forming a froth which cures into a foamed mass. Preferably, the combination of the foam components and the gaseous auxiliary blowing agent is arranged to be in a non-homogeneous state prior to passage through the discharge head.

Preferably, the auxiliary blowing agent is gaseous $CO_2$, but it could be other non-reactive gases, such as air, nitrogen or a low boiling point non-reactive volatile compound.

Advantageously, the foam components and auxiliary blowing agent are subjected to comminution upstream of the discharge head such that individual gas bubbles present in the combination are reduced in size.

Preferably, the structure of the discharge head is such as to require repeated division, divergence, convergence, change of direction and impingement of the individual flows with the sintered wire mesh and the flows through adjacent pores in three dimensions within its axial thickness, considered in the direction of flow therethrough.

In contrast to the above-described known processes using carbon dioxide as the blowing agent therefore, the present process and discharge system enables the use of a non-homogeneous mixture of foam reactants and $CO_2$ prior to the discharge device.

There are numerous advantages in being able to use gaseous carbon dioxide as the auxiliary blowing agent, including:—

(a) The high pressure and low temperature equipment required for liquid carbon dioxide are not required.
(b) The vessels containing the gaseous $CO_2$ can be stored at ambient temperatures.
(c) Sophisticated high pressure/low temperature metering system for $CO_2$ can be avoided.
(d) The Polyol or Polyol Blend system can be metered at substantially lower pressures.
(e) The need for vessel and pipework insulation necessary for liquid carbon dioxide is avoided.
(f) Refrigeration units necessary for liquid $CO_2$ are not required for the gaseous $CO_2$ storage.

As used herein, the phrase "a non-homogeneous state" in relation to a combination of foam components and "gaseous auxiliary blowing agent" means that gas bubbles are present in the combination.

Advantageously, the combination of the foam components and $CO_2$ auxiliary blowing agent is subjected to comminution upstream of the discharge head such that individual gas bubbles present in the combination are reduced in size.

The comminution can be achieved by, for example, passing the combination of the foam components and $CO_2$ through a mechanical agitator, rotary mixer, static mixer or a perforated plate.

In some embodiments, it is preferred to sparge the $CO_2$ through a porous septum into one of the foam components, usually a polyol. Typically, the porous septum has a pore size in the range 0.1 to 30 microns.

Advantageously, the gaseous $CO_2$ auxiliary blowing agent is introduced at a pressure below that necessary to keep it in the liquid phase at the temperature of the process.

The foam components are usually reactive components and may include a surfactant, in which case it can be advantageous for the surfactant to be introduced into a reactive one of the foam components before the $CO_2$.

In some embodiments, the foam components and the gaseous $CO_2$ auxiliary blowing agent can be brought together in a common manifold.

Advantageously, the velocity of the froth at exit from the discharge head is adjusted in accordance with the Darcy formula such as to achieve smooth and laminar flow.

In some embodiments, froth exiting from the permeable discharge head may be formed into a body of froth having a substantially circular cross-section.

In preferred apparatus for carrying out the aforegoing process in accordance with the present invention, the permeability coefficient of at least one said composite element is in the range $1 \times 10^{-6}$ to $200 \times 10^{-6}$ c.g.s. units.

Preferably, the thickness of said at least one composite element lies in the range 0.4 to 25 mm.

Preferably, said at least one composite element has substantially uniform pore size and tortuosity.

The individual wire meshes forming said at least one composite element may have the same or different pore sizes.

In some embodiments, said at least one composite element can comprise two or more dutch weave meshes or any variations of dutch weave, including plain, twilled, double and reverse.

In some other embodiments, said at least one composite element can comprise two or more dutch weave meshes and at least one plain weave mesh.

Some embodiments can include a common manifold coupled to the discharge head and into which all components of the foam are fed under pressure.

Advantageously, the output mixture from the permeable discharge head is deposited onto a transverse plate which lies at an angle between 20° and 70° to the horizontal.

Preferably, the cross-sectional area, pore size and permeability coefficient of said at least one composite element are selected to maintain a back-pressure before the composite element in the range 0.5 to 80 bar.

Advantageously, but not exclusively, the permeable discharge head comprises a single said composite element which is arranged to be sufficiently strong to permit the required pressure reduction in a single pass therethrough.

Utilising a discharge head of the present characteristics enables the pressure energy contained in the foam components to be used uniformly throughout the flow cross-section of the element, to obtain mixing of the foam components in their passage through the composite element. Within the overall thickness of any thin single device element (which can be as small as 1.3 mm) each individual flow stream preferably impinges at least six times with the strands of the sintered wire mesh as well as the similar flow through adjacent pores and changes direction with each impingement. The change of direction and impingement releases the energy required for the very high degree of nucleation needed for the process. It has been found that it is not necessary to add supplementary nucleating gases which are required for perforated plates.

In some embodiments, reactive foam components and a gaseous $CO_2$ auxiliary blowing agent are brought together under pressure and without pre-mixing, are passed through the permeable discharge head.

The present discharge head enables the provision of a very controlled pressure drop and thereby enables the production of uniformly high quality foam having an improved cell structure.

The sintered woven wire mesh composite used in all of the foregoing aspects of the present invention repeatedly mixes the flows as they pass through the single composite element or elements. Advantageously, the pressure energy in the reactants is used to give mixing in passing through the tortuous three dimensional path of the permeable element.

The method of achieving the necessary degree of mixing and tortuosity of the permeable discharge head is by the lamination and sintering together of multiple layers of particular types of woven wire mesh.

The diffuser element should preferably exhibit combinations of the following distinct characteristics: pore size control, uniformity of permeability, mixing and tortuosity, strength and substantial freedom from blocking.

Pore size control can be readily and accurately provided by a plain weave, ie. a weave of equal diameter wires in both warp and weft and woven into an essentially "square" pattern. A single such mesh would provide good division into the requisite number of flows. However, it would usually be unsatisfactory for the present purposes because it would not give the mixing/tortuosity that is required and it could have a too high permeability. A balance between flow rate, pore size, viscosity and pressure drop would therefore not be attainable for the production of good foams without pre-mixing.

Other types of weave have been found useful, used either in conjunction with each other or in conjunction with a plain weave in order to give the characteristics required to produce good foam.

One suitable weave is the plain dutch weave in which the wires in one direction are substantially larger than the wires used at right angles. The characteristic of this weave is that the larger wire remains straight and true whilst the smaller wire weaves over and under the larger wire. The plain dutch weave provides a much more tortuous flow path than the plain weave because the entry flow through a rectangular orifice is subdivided to pass at 90° through two smaller triangular (or skewed triangular) orifices before passing again at 90° through a rectangular discharge orifice, all within a thickness of the single mesh.

A further variation in weave pattern is the twilled dutch weave in which the smaller sires pass under and over two of the large wires. This weave provides an even more tortuous path with consequently more mixing, impingement and change of direction.

There are many other variations on weave pattern which can be used, such as twilled dutch double weave which is a very densely woven pattern.

It has been found that in order to produce good results in the production of foams, a sintered combination of various types of woven wire weaves is usually necessary. Four of the characteristics defined earlier can be obtained as follows.

1. Pore Size Control

Pore size control can be provided, for example, either by the inclusion of a plain weave layer in the sintered composite or by selection of suitable dutch weave layers. In practice, it is normally found that the inclusion of a plain weave mesh provides a uniform control over pore size. It is preferably that this type of weave is sintered with other types of weave.

2. Mixing And Tortuosity

The plain weave alone does not usually give either adequate mixing or tortuosity. This can be provided by the inclusion of a dutch weave layer (which also includes all variations on the dutch weave).

The tortuosity can be provided as described earlier by the necessity of the individual flows to change direction and release the energy necessary for the high degree of nucleation required by the process. This whole process may be repeated multiple times, preferably more than 4 times, depending upon the number and type of dutch weave layers incorporated into the sintered composite.

3. Rigidity

It has been found that there can be advantage in some cases in relation to the quality of the resulting foam for the composite sintered elements to be thin and to have a total thickness between 0.4 and 25 mm, preferably between 0.5 and 3 mm. The effective area (i.e. the diameter if the device is round) will be relatively large in order to provide the necessary flow characteristics. This requires that the device has very high strength and rigidity for such a thin element.

The rigidity can be provided by the design aspects, the selection of weaves, the orientation of successive laminations within the sintered composite and the final processing of the sintered composite.

By incorporating the dutch weave mesh, large stiff wires are provided with a much greater rigidity than plain weave mesh. Use of a dutch weave with a high wire diameter ratio, increases the rigidity still further. When these meshes are sintered together with the large diameter wires at 90° to each other in adjacent layers, the rigidity in all planes is greatly increased. The overall strength of the composite is improved by placing dutch weave meshes at the outer skins of the composite so that the moment of inertia of the composite is increased and the skin stresses (ie. the highest bending stresses) are carried by the largest wires.

The overall strength can be further improved by forming the composite sinter into a convex dish shape (in the direction of flow) by cold forming. This has the effect of changing the direction of the stresses from being at right angles to the plane of mesh to a more tangential stress of reduced magnitude.

4. Freedom From Blocking

With a sintered woven wire composite there are substantially no blind passages.

This phenomena may be utilised in the construction of the sintered composite by incorporating a suitable sized dutch weave layer before any plain weave layer thus preventing larger particles from blocking the plain weave layer.

The sintered composite provides a system whereby the variation in orifice size over the whole area is controlled within a very narrow range.

A further advantage of this thin sintered woven wire mesh is that little or no frothing takes place within the sinter element. The froth is largely formed after passing through the sinter element. Other devices such as described in WO96/00644 which have multiple screens or WO96/02377 which have a packing thickness between 10 and 400 mm, may permit frothing to take place during the passage through the devices. This could be detrimental to the froth and cause the bubbles within the froth to coalesce, which in turn can cause holes in the foam.

The effective area of any diffuser element can be calculated from a modified Darcy (D'Arcy) formula/equation:

$$A = \frac{v \cdot l \cdot n}{981 \phi \cdot P \cdot t}$$

Where:
v=volume of fluid flowing in ccs in time t seconds
p=pressure drop across element in gms/sq. cm.
A=effective area of element in sq. cm.
n=absolute viscosity in centipoise (=absolute viscosity in Pa. s. $10^{-3}$)
l=thickness of element in cms.
$\phi$=permeability coefficient (i.e. measurement of flow through element in cgs (cm. gm. second) units).

The or each permeable element can if desired be formed into a convex profile (when viewed from the discharge side) over its effective area to increase its strength.

Advantageously, the permeable element is formed into a convex profile having a convex depth to diameter ratio between 1:4 and 1:20.

Advantageously, the permeable element is pre-formed with a swaged rim at or near its periphery which is engaged by mating shapes in metering rings clamped at either side, thus improving retention of the permeable element against high pressures.

BRIEF DESCRIPTION OF THE DRAWINGS

The invention is described further hereinafter, by way of example only, with reference to the accompanying drawings, in which:—

Figure 6:
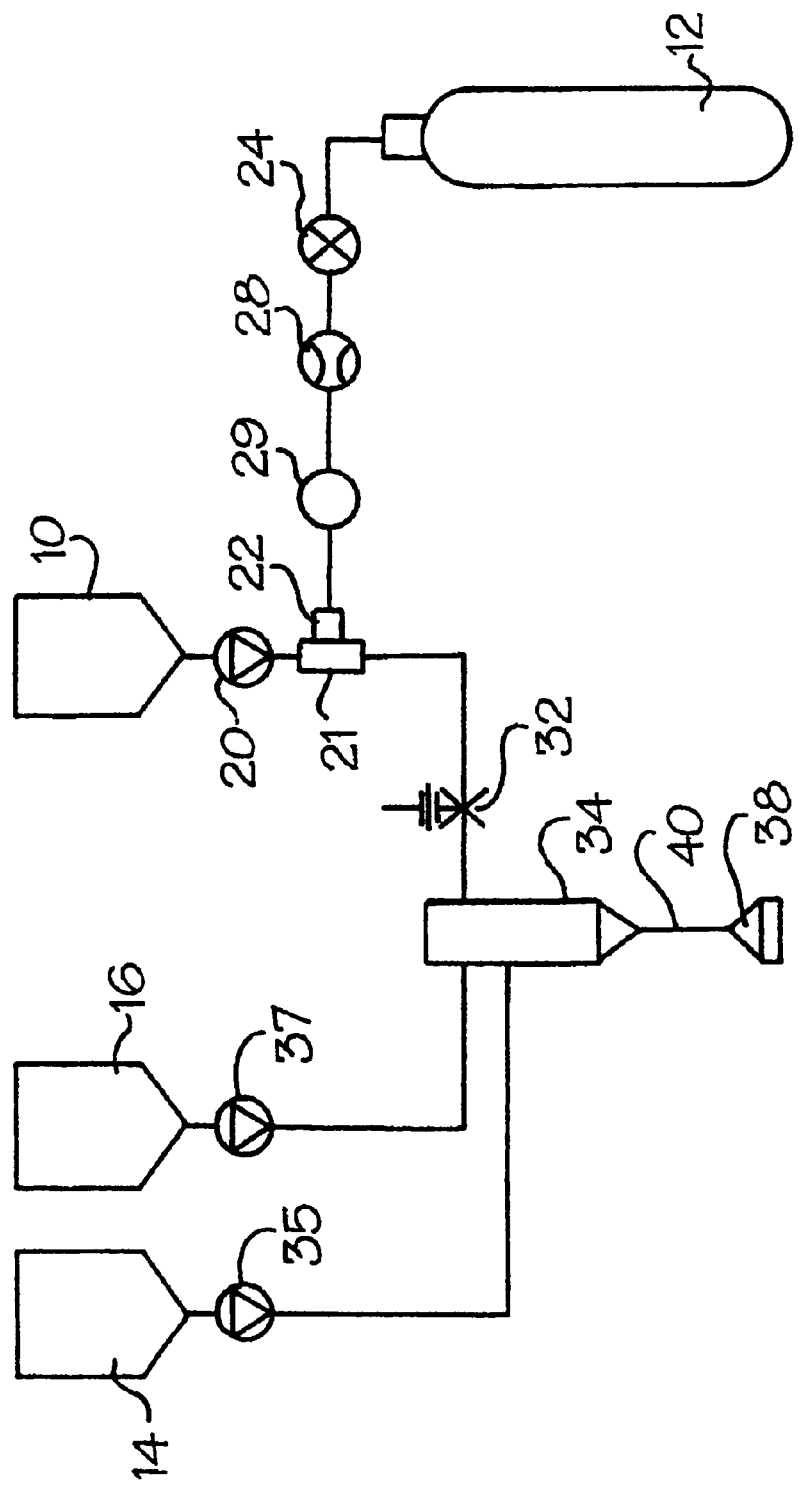
FIG. 6 is a diagrammatic illustration of one possible embodiment of a foam making apparatus for carrying out the process of the present invention.

Referring first to FIG. 6 there is shown an example of a system embodying the present invention using $CO_2$ as the auxiliary blowing agent. The apparatus comprises a first tank 10 for holing a polyol or polyol blend, a cylinder 12 for storing gaseous carbon dioxide, a second tank 14 for holding TDI (an isocyanate) and a third tank 16 for holding a tin catalyst. The polyol from tank 10 is metered via a pump 20 to a block 21 where the gaseous carbon dioxide is sparged through a porous septum 22. The gaseous carbon dioxide is fed via a pressure regulator 24, a flowmeter 28, a non-return valve 29 and the porous septum 22. The polyol and gaseous carbon dioxide are fed under pressure (possibly via a pressure regulating valve 32) to a comminution device 34, such as a rotary mixer, where the polyol and carbon dioxide are added to the isocyanate and tin catalyst fed from the tanks 14 and 16 respectively by pumps 35, 37 whilst maintaining the combination in a non-homogeneous state. One action of the comminution device is to reduce the size of bubbles of gas present in the combination of the foam components and the $CO_2$ auxiliary blowing agent. This gas can include gases other than $CO_2$, which may be released from, or which have been added to, the foam components.

Figure 1:
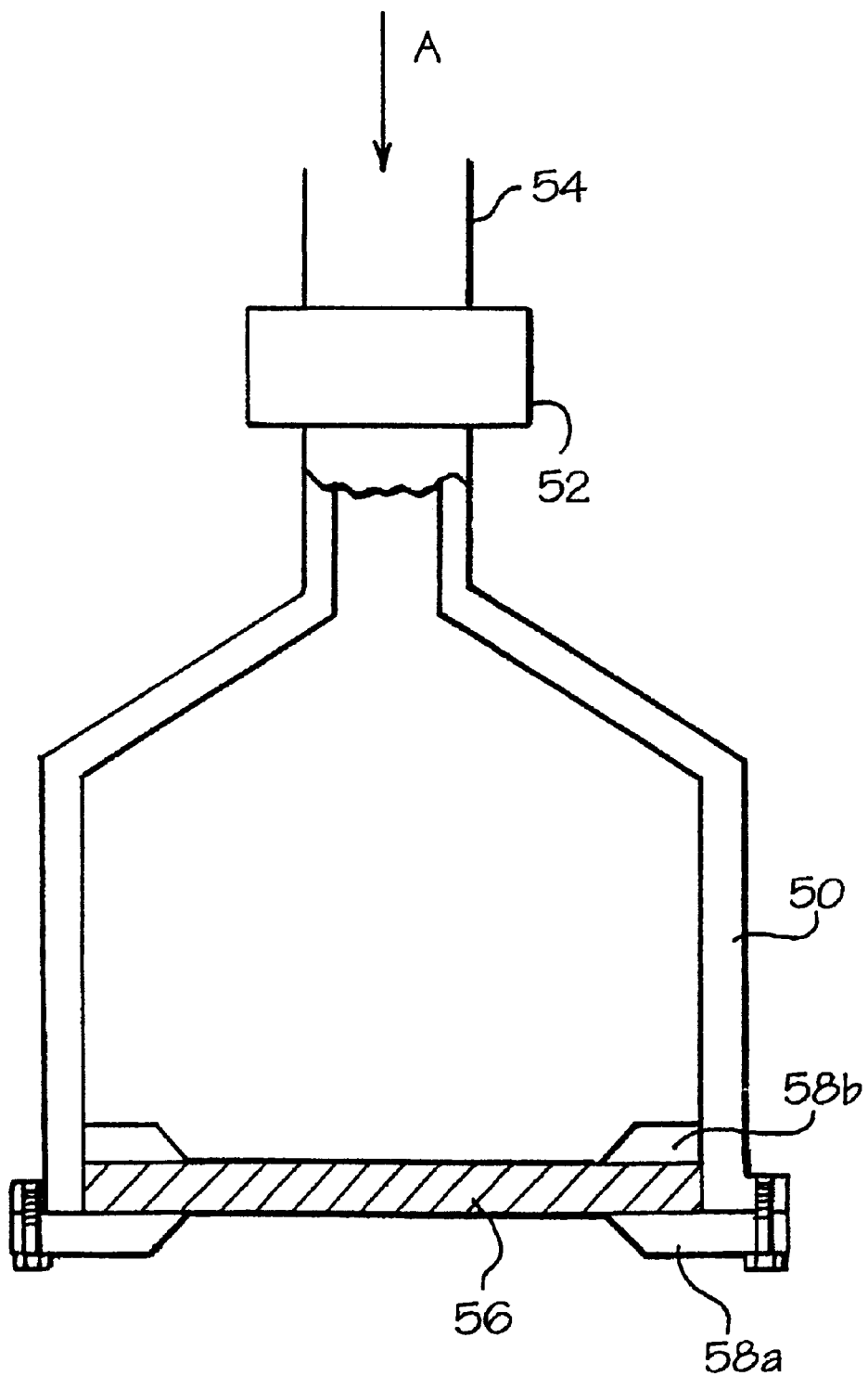
FIG. 1 is a diagrammatic sectional view of one embodiment of a permeable discharge head in accordance with the present invention.

The resultant combination of foam components and auxiliary blowing agent is fed via a connection 40, still under pressure, to an expansion system in the form of a discharge head 38 which is illustrated only schematically in FIG. 1.

The polyol blend can comprise polyol, water, catalyst and activators. It has been found advantageous for the stabilisation of the froth and to provide the correct degree of surface tension for the bubbles to inject a surfactant into the polyol, either before or immediately after the injector block 21.

The $CO_2$ can be introduced either into the polyol or polyol blend stream.

When using the apparatus of FIG. 6, the pump 20 not only meters exact amounts of the polyol or polyol blend but increases the pressure to approximately 30 bar. In some practical applications, it is advantageous to meter the activator at low pressure (approx 2 to 10 bar) and this can be achieved by introducing the activators prior to the polyol pump.

In FIG. 6, recirculation systems on all streams which may usually be present in practice have been omitted for clarity.

FIG. 1 is a diagrammatic cross-sectional view of one possible permeable discharge head for an apparatus in accordance with the present invention and comprises a generally bell-shaped housing 50 having a coupling 52 at one end for connection to an inlet pipe 54 carrying, in use, the foam components and gaseous $CO_2$ auxiliary blowing agent travelling in direction A is a non-homogeneous state. Mounted at the downstream, outlet end of the housing 50 is at least one composite element 56 constructed of a number of individual disc-shaped woven wire meshes which have been sintered together to form a unitary body. The element(s) 56 is clamped firmly between flanges 58a, 58b, possibly with the addition of circular seals (not shown) to assist in preventing flow of foam components around the periphery of the element 56.

Whereas in the illustrated embodiment the element 56 is circular, in other embodiments it could be of different shapes, e.g. rectangular. As explained hereinbefore, the element 56 is made up of sintered woven wire meshes, normally but not necessarily of metal.

Although the invention is not limited to the use of such weaves, FIGS. 2–5 shows examples of dutch weave meshes for use in forming the composite element 56.

Figure 2:
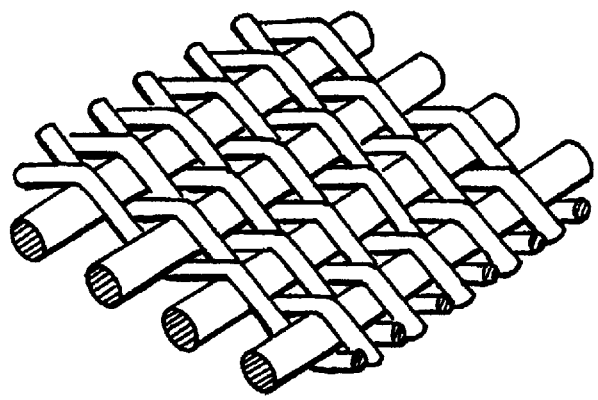
FIGS. 2–5 show examples of dutch weaves for use in the present invention.
Figure 3:
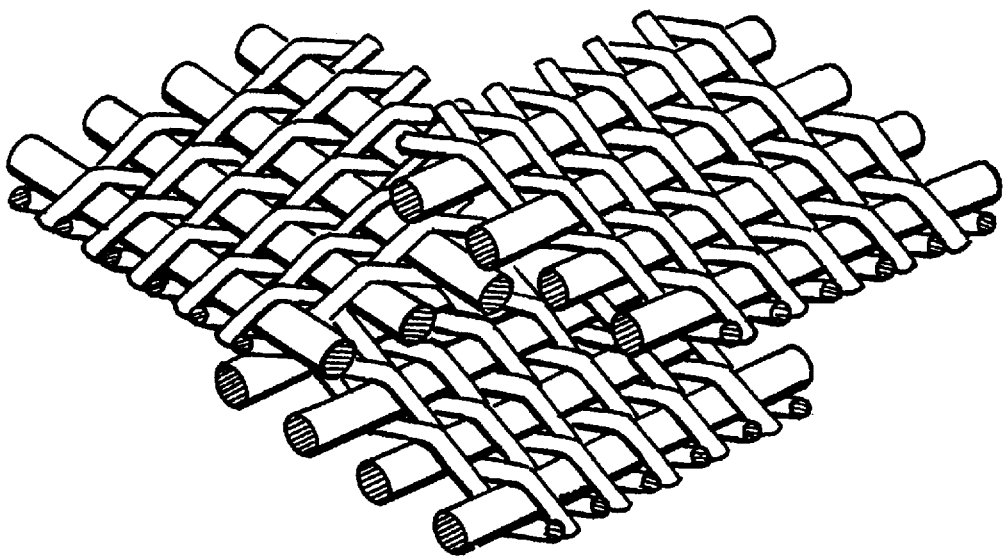
Figure 4:
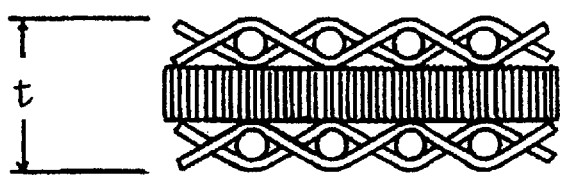

FIG. 2 shows a single layer of plain dutch weave. FIG. 3 shows three layers of plain dutch weave with adjacent layers oriented at 90°. FIG. 4 is an end view of the assembly of FIG. 3. The assembly of FIGS. 3 and 4 has a composite thickness "t".

Figure 5:
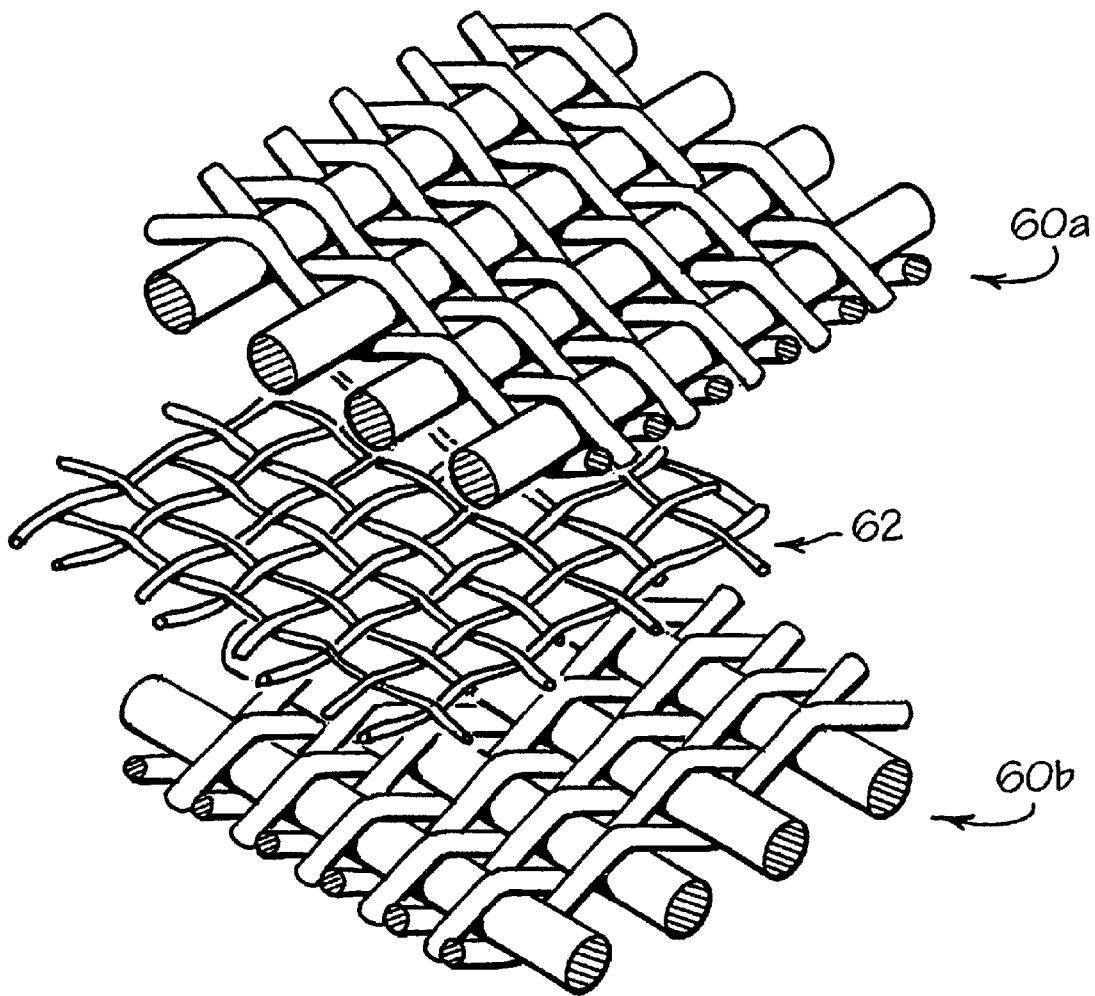

FIG. 5 shows a preferred arrangement for forming the composite element 56 which comprises two plain dutch weave outers 60a, 60b oriented at 90° to each other, and a plain weave inner 62. In the plain dutch weave 60a the larger wires run East–West, as viewed. In the plain dutch weave 60b, the larger wires run North–South.

An inherent characteristic of sintered woven wire mesh composite as used herein is that is can be designed and manufactured to give a wide range of permeability at a constant pore size rating. This characteristic cannot be achieved using sintered plates produced from particles, as discussed in our earlier application WO/98/30376 to which reference is directed.

It is possible to produce a wide range of permeability versus pore size combinations which allows the exact selection of a suitable permeable discharge head for a wide range of chemical formulations and systems.

The advantage of the use of sintered woven wire mesh composite applies to the mixing/tortuosity of the system. By incorporating plain weaves, the tortuosity is reduced and by incorporating dutch weaves (and variations such as twilled and reverse dutch weaves) the tortuosity is increased.

Sintered woven wire mesh composites allow the possibility to control the permeability, pore size, mixing and tortuosity independently.

An example in accordance with the present invention is now described of the use of a sintered woven wire mesh in a process of the type illustrated in FIG. 6, using gaseous $CO_2$ as the auxiliary blowing agent.

EXAMPLE 1

A foam run was conducted with a total output of 23 kg per minute of reactive materials based on 100 parts polyol, 4.5 parts water, 3 parts gaseous $CO_2$, and TDI index 110. The discharge head 38 comprised a sintered woven wire mesh composite of 18 micron and a diameter of 30 mm. All the reactants plus gaseous $CO_2$ blowing agent were fed into the comminution device 34 at a pressure such that the combination of the foam components and the gaseous $CO_2$ auxiliary blowing agent was, and remained, in a non-homogeneous state, containing bubbles of $CO_2$, prior to passage through the discharge head 38. Good fine open cell structure foam was made of density 17.3 kg per cubic meter.

What is claimed is:

1. A process for producing polyurethane foam, comprising bringing together under pressure one or more reactive foam components and a gaseous non-reactive auxiliary blowing agent to form a combination and discharging the combination through a permeable discharge head in the form of plural individual wire meshes sintered together to form at least one composite element which repeatedly mixes the combination as it passes therethrough, and reduces the pressure causing the combination to form a froth which cures into a foamed mass.

2. A process as claimed in claim 1, wherein the combination of the foam components and the gaseous auxiliary blowing agent is arranged to be in a non-homogeneous state prior to passage through the discharge head.

3. A process as claimed in claim 1 or 2, wherein the auxiliary blowing agent is gaseous $CO_2$.

4. A process as claimed in claim 1 or 2, wherein the auxiliary blowing agent is air, nitrogen or a low-boiling point non-reactive volatile compound.

5. A process as claimed in claim 1, in which the foam components and auxiliary blowing agent are subjected to comminution upstream of the discharge head such that individual gas bubbles present in the combination are reduced in size.

6. A process as claimed in claim 5, wherein the comminution is achieved by passing the combination of the foam components and $CO_2$ through a mechanical or sonic agitator.

7. A process as claimed in claim 5, wherein the comminution is achieved by passing the combination of the foam components and $CO_2$ through a rotary mixer.

8. A process as claimed in claim 5, wherein the comminution is achieved by passing the combination of the foam components and $CO_2$ through a static mixer.

9. A process as claimed in claim 5, wherein the comminution is achieved by passing the combination of the foam components and $CO_2$ through a perforated element.

10. A process as claimed in claim 1, wherein the $CO_2$ gas is sparged through a porous septum into one of the foam components.

11. A process as claimed in claim 10, wherein said one of the foam components is a polyol.

12. A process as claimed in claim 10 or 11, wherein the porous septum has a pore size in the range of 0.1 to 30 micron.

13. A process as claimed in claim 1, wherein the gaseous $CO_2$ auxiliary blowing agent is introduced at a pressure below that necessary to keep it in the liquid phase at the temperature of the process.

14. A process as claimed in claim 1, wherein the reactive components include a surfactant, the surfactant being introduced into a reactive one of the foam components before the gaseous auxiliary blowing agent.

15. A process as claimed in claim 1, in which the foam components and the gaseous auxiliary blowing agent are brought together in a common manifold.

16. A process as claimed in claim 1, wherein the froth exits the discharge head in a smooth and laminar flow.

17. A process for the manufacture of polymeric foam as claimed in claim 1, wherein froth exiting from the permeable discharge head is formed into a body of froth having a substantially circular cross-section.

18. An apparatus for carrying out the process as claimed in claim 1, wherein a permeability coefficient φ of at least one said composite element is in the range $1 \times 10^{-6}$ to $200 \times 10^{-6}$ according to the equation:

$$\phi = \frac{v \cdot l \cdot n}{981 \cdot A \cdot p \cdot t}.$$

19. An apparatus as claimed in claim 18 wherein the thickness of said at least one composite element lies in the range 0.4 to 25 mm.

20. An apparatus as claimed in claim 18 or 19 in which said at least one composite element has substantially uniform pore size and tortuosity.

21. An apparatus as claimed in claim 18, wherein the individual wire meshes forming said at least one composite element have the same or different pore sizes.

22. An apparatus as claimed in claim 18, wherein said at least one composite element comprises two or more dutch weave meshes.

23. An apparatus as claimed in claim 18, wherein said at least one composite element comprises two or more dutch weave meshes and at least one plain weave mesh.

24. An apparatus as claimed in claim 18, including a common manifold coupled to the discharge head and into which all components of the foam are fed under pressure.

25. An apparatus as claimed in claim 18, in which the output mixture from the permeable discharge head is deposited onto a transverse plate which lies at an angle between 20° and 70° to the horizontal.

26. An apparatus as claim in claim 18, in which the combination of the foam components and the gaseous auxiliary blowing agent have a back-pressure in the range 0.5 to 80 bar prior to entering the composite element.

27. A polymeric foam produced by the process of claim 1.

* * * * *